Patented Mar. 25, 1947

2,417,992

UNITED STATES PATENT OFFICE 2,417,992

N,N-DIALKYL MORPHOLINIUM ALKYL-SULFATES

Joseph B. Niederl, Victor Niederl, and Martin E. McGreal, Brooklyn, N. Y.

No Drawing. Application April 14, 1942, Serial No. 438,896

4 Claims. (Cl. 260—247)

This invention relates to N,N-dialkyl morpholinium alkyl sulfates and especially to N-alkyl-N-methyl morpholinium methosulfates and N-alkyl-N-ethyl morpholinium ethosulfates and their production.

This application is a continuation-in-part of application Serial No. 435,638, filed March 21, 1942.

A reaction between a tertiary morpholine and a di-alkyl sulfate can be effected either by simply mixing the two reactants, as in the case of dimethyl sulfate, or by heating the reagents, as in the case of diethyl sulfate.

The alkyl sulfates, and especially the methosulfates, quaternary ammonium salts derived from alkylated morpholine, have certain specific advantages when compared to other quaternary ammonium salts of alkylated morpholines such as those derived from halides. In the first place, the N-methyl-N-alkyl morpholinium methosulfates are more easily prepared. In the second place, they are generally more stable to heating and also to reagents normally causing the disintegration of quaternary ammonium salts of morpholine.

While the reaction of the present invention may be carried out in the absence of solvents or diluents, it is sometimes preferable to use diluents as in the case of dimethyl sulfate. Various diluents or solvents may be used, including esters, such as, ethyl acetate, etc.; hydrocarbons, such as, benzene, toluene, petroleum ether, ligroin, kerosene, etc.; alcohols, such as, ethyl alcohol, methyl alcohol, etc.; ethers, such as, diethyl and diisopropyl ethers; and halogen compounds, such as, chloroform, carbon tetrachloride; and the like.

In a special embodiment of the invention the reaction between the N-alkyl morpholine and the dimethyl sulfate is carried out in the presence of ethyl acetate or diisopropyl ether. These solvents have the advantage of retaining the reactants in a homogeneous form during the reaction and yet permitting the crystallizing out of the N-dialkyl morpholinium methosulfate, upon cooling, without the necessity of removing the solvent. Thus, these solvents serve both as homogenizers and as crystallizing mediums. Other solvents may be used which will serve functionally in the same manner. It is to be understood, therefore, that the claims, directed to reactions taking place in the presence of ethyl acetate or diisopropyl ether, encompass such equivalents.

In carrying out the reactions, it is preferable to regulate the temperatures in such a manner that the reactants are retained in solution during the reaction. In general, temperatures above 30° C. and not in excess of 60° C. are most suitable for the preparation of the methosulfates, while a temperature of 100° C. is employed for the preparation of the ethosulfates.

In carrying out the reaction, it is customary to add the lower molecular weight dialkyl sulfate to the N-alkyl morpholine. The introduction of the dialkyl sulfate, for example, dimethyl sulfate, can be so regulated that the exothermic heat of the reaction will maintain the reaction mass at the most desirable reaction temperature.

The N-substituted morpholines of the present invention, used as raw materials, include various N-hydrocarbon substituted morpholines having the formula

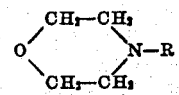

in which R may either be a saturated alkyl radical of the general formula $C_nH_{2n-1}$, such as, methyl, ethyl, propyl, butyl, lauryl, myristyl, cetyl, octadecyl, etc., or an unsaturated alkyl radical corresponding to the general formulas $C_nH_{2n-3}$ or $C_nH_{2n-5}$. The radical may also be an aromatic radical corresponding to the general formula $C_nH_{2n-7}$ such as phenyl-, benzyl-, tolyl- and the like.

The following examples disclose illustrative embodiments of the invention but are not to be considered a limitation upon it.

*Example 1*

An N-alkyl morpholine is introduced into an appropriate reaction vessel. Thereafter, an equimolar proportion of dimethyl sulfate is gradually introduced under constant stirring. The addition of the dimethyl sulfate is preferably regulated so that the reaction mixture remains liquid throughout the reaction period. Upon the completion of the addition, the reaction product is allowed to cool and then crystallized from water or ethyl acetate.

*Example 2*

One mole of an N-alkyl morpholine, such as N-lauryl, N-myristyl, N-cetyl, N-octadecyl morpholine, and the like, is dissolved in two parts of ethyl acetate contained in a spacious round-bottomed flask having three necks and provided with an efficient water condenser, a stirrer, and an addition funnel. One mole of dimethyl sulfate is added to this solution under constant stirring in such a manner that the temperature ranges from 50° C. to 55° C. and the reaction mass is maintained in a homogeneous form. Upon cooling, crystals of the N-methyl-N-alkyl morpholinium methosulfate separate out. After the reaction mass is allowed to stand for at least twelve hours, the crystalline N-alkyl-N-methyl morpholinium methosulfate is separated from the ethyl acetate solution either by filtration or centrifuging.

Example 3

One mole of an N-alkyl morpholine (N-lauryl, N-myristyl, N-cetyl, N-octadecyl morpholine, and the like) is dissolved in two parts of 95% ethyl alcohol. The resulting solution is placed in a spacious round-bottomed flask having three necks and provided with an efficient condenser, a stirrer, and an addition funnel. One mole equivalent of dimethyl sulfate is added in drops under constant agitation in such a manner that the temperature does not rise above the boiling point of the ingredients of the mixture. Upon the completion of the addition, the reaction mass is allowed to stand for at least twelve hours. After this time, the ethyl alcohol is distilled off, the residue is dissolved in a minimum amount of boiling water (approximately 6 parts), and the hot solution is filtered. The clear filtrate is then evaporated to dryness on a steam bath whereby the N-alkyl-N-methyl morpholinium methosulfate is produced in the form of a crystalline hydrate.

Example 4

An alcoholic solution containing a crude N-alkyl morpholine is placed in an appropriate reaction vessel which is preferably provided with a stirrer, a condenser, and a means for introducing other reagents. Such a crude N-alkyl morpholine may be obtained by reacting morpholine with an alkyl halide in an ethyl alcohol solution in the presence of anhydrous sodium carbonate, as described in U. S. Patent application Serial No. 435,638. The halides may be either high or low molecular, including octadecyl, cetyl, myristyl, lauryl, octyl, methyl halides, and the like. The amount of the N-alkyl morpholine present in the reaction mixture is previously determined by analysis.

An equivalent amount of dimethyl sulfate is added gradually to the aforesaid alcohol solution of the crude N-alkyl morpholine under constant stirring. The addition is advantageously regulated in a manner which does not result in the reaction mass vaporizing. Upon the completion of the addition, the reaction mixture is permitted to stand for twelve hours or more. Then the ethyl alcohol is distilled off and the residue dissolved in a minimum amount of boiling water. Thereafter, the hot solution is filtered and the filtrate evaporated to dryness on a steam bath. The resulting N-alkyl-N-methyl morpholinium methosulfate is of high purity.

Example 5

One mole of N-cetyl morpholine is dissolved in two parts of ethyl acetate. The solution is introduced into an appropriate reaction vessel which is advantageously provided with a condenser, a stirrer, and a means for introducing the dimethyl sulfate. One mole of dimethyl sulfate is gradually stirred into the N-cetyl morpholine solution in such a manner that the exothermic heat maintains the reaction mass homogeneous. The temperature developed during this reaction ranges advantageously from about 50° C. to about 55° C. Upon cooling, the crystals of the N-methyl-N-cetyl morpholinium methosulfate separate out. After permitting the reaction mass to stand for a period of at least twelve hours, the crystalline reaction product may be easily separated from the ethyl acetate solution by filtration or centrifuging.

Example 6

One mole of N-cetyl morpholine is dissolved in 300 ml. of isopropyl ether. The resulting solution is placed in an appropriate reaction vessel of about three-liter capacity and provided with a condenser, a stirrer, and an addition funnel for the gradual introduction of the dimethyl sulfate. One mole of dimethyl sulfate is gradually added over a period of an hour, during which the temperature of the reactants rises to 50–55° C. Upon cooling, the reaction mixture solidifies within twelve hours to a waxy mass. Fifty milliliters of 95% ethyl alcohol is then added, and the entire mass is heated to about 60° C., which is sufficient to obtain a clear solution. After allowing this solution to stand for twenty-four hours, the N-methyl-N-cetyl morpholinium methosulfate crystallizes out in fine white needles, which are filtered off and dried.

Example 7

One mole of diethyl sulfate is gradually added to one mole of N-alkyl morpholine, contained in an appropriate vessel, while agitating the reaction mixture. After the addition of the diethyl sulfate, a reflux condenser is attached to the reaction vessel and the reactants are heated on the steam bath for twenty-four hours to 100° C., or until the reaction mixture has the tendency to completely solidify upon cooling. Then the reaction mixture is left standing at room temperature for twenty-four hours, during which time the material becomes a solid, waxy mass which is washed with isopropyl ether and then dried in a vacuum desiccator; or the product is crystallized from a suitable solvent. As a whole, the ethosulfates show a higher rate of solubility in water, as well as in organic solvents, than the corresponding methosulfates.

The physical constants of some of the more important surface-active and bactericidal N,N-dialkyl morpholinium alkylsulfates are given below:

| | Melting point, °C. |
|---|---|
| N-methyl-N-lauryl morpholinium methosulfate | 47 |
| N-methyl-N-myristyl morpholinium methosulfate | 55 |
| N-methyl-N-cetyl morpholinium methosulfate | 68 |
| N-methyl-N-octadecyl morpholinium methosulfate | 81 |
| N-ethyl-N-lauryl morpholinium ethosulfate | 40–43 |
| N-ethyl-N-myristyl morpholinium ethosulfate | 48–50 |
| N-ethyl-N-cetyl morpholinium ethosulfate | 60–64 |
| N-ethyl-N-octadecyl morpholinium ethosulfate | 71–75 |

The bactericidal potency of the listed compounds is illustrated by the phenol coefficients of the N-cetyl-N-methyl morpholinium methosulfate and the N-cetyl-N-ethyl morpholinium ethosulfate which is one thousand three hundred (1300) when determined at a pH of 9.

The foregoing examples all relate to reactions involving dimethyl and diethyl sulfate. It should be understood, however, that other dialkyl sulfates may be used in the reaction process, especially those of a low molecular weight.

The examples disclose reactions involving molar ratios. An excess of either of the reagents may be present, however, without deleteriously affecting the results since the reactions will take place in equimolar proportions. Of course, the introduction of an excess of either of the reagents unnecessarily complicates the separatory processes.

It should be understood also that the present invention is not limited to the specific compounds disclosed nor to the exact procedures described, for it extends to all equivalents which will occur to those skilled in the art upon considering the claims appended hereto.

We claim:

1. A neutral, water-soluble, capillary-active, and substantially acid- and alkali-stable disinfecting N,N-dialkyl morpholinium alkyl sulfate having the formula

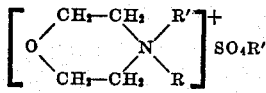

wherein R is an unsubstituted straight chain alkyl hydrocarbon radical of from 12–18 carbon atoms and R' is an alkyl chain consisting of a continuous saturated aliphatic hydrocarbon chain of from 1–2 carbon atoms.

2. A very water-soluble, neutral, capillary-active and substantially acid- and alkali-stable disinfecting compound, N-ethyl-N-hexadecyl morpholinium ethosulfate.

3. Crystalline, neutral, capillary-active, acid- and alkali-stable N-methyl-N-hexadecyl morpholinium methosulfate.

4. Crystalline, neutral, capillary-active, acid- and alkali-stable N-methyl-N-hexadecyl morpholinium methosulfate hydrate.

JOSEPH B. NIEDERL.
VICTOR NIEDERL.
MARTIN E. McGREAL.

REFERENCES CITED

The following references are of record in the file of this patent:

UNITED STATES PATENTS

| Number | Name | Date |
|---|---|---|
| 2,295,504 | Shelton | Sept. 8, 1942 |
| 2,129,805 | Wilson | Sept. 13, 1938 |
| 2,132,903 | Lenker | Oct. 11, 1938 |
| 2,229,024 | Bruson | Jan. 21, 1941 |
| 2,054,257 | Heuter | Sept. 15, 1936 |
| 2,186,628 | Dickey | Jan. 9, 1940 |
| 2,132,902 | Lenker | Oct. 11, 1938 |

FOREIGN PATENTS

| Number | Country | Date |
|---|---|---|
| 433,356 | British | Aug. 13, 1935 |
| 474,671 | British | Apr. 15, 1937 |

OTHER REFERENCES

Von Bramer, 542 O. G. 183, 127 F(2d) 149.
Organic Chemistry by Gilman, 1938 ed., vol. 1, p. 677. (Copy in Patent Office Library.)
Alexander Milburn v. Davis Bournonville, 1926 C. D. 303 J. P. O. S., December 1943, pages 905–906.
Thuau, 57 U. S. P. Q. 324.
Carr, 1924, C. D. 268.